3,296,187
3-SUBSTITUTED AMINO-6-CHLOROPYRIDAZINES AS ANTIOXIDANTS FOR RUBBER
Douglas I. Relyea, Pompton Plains, N.J., assignor to United States Rubber Company, New York, N.Y., a corporation of New Jersey
No Drawing. Filed June 26, 1963, Ser. No. 290,592
10 Claims. (Cl. 260—45.8)

This application is a continuation-in-part of my application Serial No. 233,877, filed October 29, 1962, now U.S. Patent No. 3,161,639, issued December 15, 1964.

This invention relates to new antioxidants for rubber.

The antioxidants of the present invention are 3-substituted amino-6-chloropyridazines represented by the formula

wherein R is monoalkylamino, dialkylamino, cycloalkylamino or anilino. The alkyl groups in the monoalkylamino and dialkylamino radicals will have from 1 to 8 carbon atoms, e.g., methyl, ethyl, propyl, butyl, hexyl, octyl. The cycloalkyl group in the cycloalkylamino radical will have from 5 to 8 carbon atoms, e.g., cyclopentyl, cyclohexyl, cyclooctyl.

The chemicals of the present invention are prepared by reacting 3,6-dichloropyridazine, a known chemical, with the selected amine in an inert solvent, e.g., ethanol, xylene, benzene, pyridine, dioxane.

Examples 1 and 2 illustrate the preparation of the chemicals of the present invention.

EXAMPLE 1

*Preparation of 3-n-butylamino-6-chloropyridazine*

A solution of 74.5 gm. (0.5 mole) of 3,6-dichloropyridazine in 250 ml. of reagent pyridine was mixed with 99 ml. (1.0 mole) of redistilled n-butylamine. The clear solution was heated at reflux (112° C.) for four hours and then transferred to a beaker containing 2 liters of water which was being agitated vigorously. The precipitate thus formed was separated from the light brown liquid by filtration, thoroughly washed with 2 liters of water and subsequently redissolved in 88 ml. (1.07 moles) of conc. HCl and 150 ml. of water and reprecipitated in 2 liters of water containing 100 gm. of sodium hydroxide. The white precipitate was washed three more times, using 2 liters of water each time. After the third washing, the wash water showed no reaction to litmus paper. The product was then dried at 50° C. (and 50 mm. pressure), resulting in 60 gm. of 3-n-butylamino-6-chloropyridazine having a melting point of 110.9–111.5° C.

Analysis for $C_8H_{12}N_3Cl$:

|  | Calculated | Found |
| --- | --- | --- |
| Percent C | 51.75 | 51.68 |
| Percent H | 6.52 | 6.58 |
| Percent Cl | 19.10 | 18.93 |
| Percent N | 22.63 | 22.41 |

EXAMPLE 2

By the same procedure described in Example 1, there were prepared other aminochloropyridazines by substituting equimolar proportions of di-n-butylamine, cyclohexylamine, aniline, and isopropylamine for the n-butylamine of Example 1. Melting points of these chemicals were as follows:

|  | °C. |
| --- | --- |
| 3-di-n-butylamino-6-chloropyridazine | 57–58 |
| 3-cyclohexylamino-6-chloropyridazine | 167–168 |
| 2-anilino-6-chloropyridazine | 178–181 |
| 3-isopropylamino-6-chloropyridazine | 110–112 |

Analyses for the above four compounds in the order given above are shown in the following table:

|  | Calculated | | | | Found | | | |
| --- | --- | --- | --- | --- | --- | --- | --- | --- |
|  | Percent C | Percent H | Percent Cl | Percent N | Percent C | Percent H | Percent Cl | Percent N |
| Analysis for: | | | | | | | | |
| $C_{12}H_{20}N_3Cl$ | 59.61 | 8.35 | 14.67 |  | 60.82 | 8.53 | 14.66 |  |
| $C_{10}H_{14}N_3Cl$ | 56.73 | 6.66 | 16.75 | 19.85 | 57.95 | 6.81 | 16.70 | 19.76 |
| $C_{10}H_8N_3Cl$ | 58.40 | 3.92 | 17.24 | 20.43 | 61.00 | 4.21 | 15.24 | 20.21 |
| $C_7H_{10}N_3Cl$ | 48.99 | 5.87 | 20.66 | 24.48 | 48.86 | 6.11 | 20.64 | 24.13 |

The chemicals of the present invention are anti-oxidants for rubbers, such as natural rubber and synthetic rubbers, and mixtures thereof. The synthetic rubbers may be the products of aqueous emulsion polymerizations with a peroxide catalyst of various rubber-forming monomers. Such synthetic rubbers may be polymers of butadienes-1,3 e.g. butadiene-1,3, 2-methylbutadiene-1,3 (isoprene), 2-chlorobutadiene-1,3 (chloroprene), 2,3-dimethylbutadiene-1,3, piperylene, and copolymers of mixtures thereof, and copolymers of mixtures of one or more such butadienes-1,3 with up to 70% of such mixtures of one or more monoethylenic compounds which contain a $CH_2=C<$ group where at least one of the disconnected valences is attached to an electro-negative group, that is a group which substantially increases the electrical dissymmetry or polar character of the molecule. Examples of such monoethylenic compounds which are copolymerizable with butadienes-1,3, are aryl olefins, such as styrene, vinyl naphthalene, alpha-methylstyrene, parachlorostyrene, dichlorostyrene, alpha-methyldichlorostyrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pryidines, such as 2-vinyl pyridine, 2-methyl-5-vinyl pyridine; vinyl carbazole. Commercial synthetic rubbers of this type are SBR (copolymer of a major proportion of butadiene and a minor proportion of styrene) and NBR (copolymer of a major proportion of butadiene and a minor proportion of acrylonitrile). The synthetic rubber may also be a 1,4-polybutadiene or a 1,4-polyisoprene, prepared by solution polymerization. Such 1,4-polybutadiene may be made by solution polymerization of butadiene-1,3 in the presence of a catalyst reaction product of an aluminum trialkyl, such as aluminum triethyl, and titanium iodide. Such 1,4-polyisoprene may be made by solution polymerization of isoprene in the presence of a catalyst reaction product of an aluminum trialkyl, such as aluminum triisobutyl, and titanium tetrachloride. The synthetic rubber may also be the product of the solution polymerization of a mixture of a major proportion of isoolefin and a minor proportion of conjugated diene at low temperature in the presence of a Friedel-Crafts polymerization catalyst of the type of aluminum chloride or boron trifluoride. An example of a commercial synthetic rubber of this type is butyl rubber which is a copolymer of about 95 to 99 parts of isobutylene and correspondingly 5 to 1 parts of isoprene. The synthetic rubber may also be the product of the solution polymerization of a mixture of ethylene and at least one alpha olefin having the formula $CH_2=CHR$ in which R is an alkyl radical having 1 to 8 carbon atoms, e.g. propylene, with a minor proportion of a non-conjugated diene, such as 1,4-hexadiene or dicyclopentadiene, in the presence of a catalyst reaction product of aluminum trialkyl, and titanium tetrahalide or vanadium tetrahalide or vanadium oxytrihalide, e.g. the reaction product of aluminum tridecyl and vanadium oxytrichloride. An example of a synthetic rubber of this type is a terpolymer of about 55% propylene, 41% ethylene and 4% 1,4-hexadiene. The amount of antioxidant will be from 0.1 to 5 parts by weight per 100 parts of the rubber.

EXAMPLE 3

This example illustrates the effectiveness of various chemicals of the present invention as antioxidants for sulfur-vulcanizable rubbers, such as natural rubber.

Five rubber stocks A to E were compounded on a two-roll mill by mixing into 100 parts of Hevea rubber, 2 parts of stearic acid, 45 parts of HAF (high abrasion furnace) carbon black, 3 parts of zinc oxide, 6 parts of Paraflux softener (a saturated polymerized petroleum hydrocarbon having a specific gravity of 1.02 and a Saybolt Furol Viscosity of 250–350 seconds at 140° F.), 2.75 parts of sulfur and 0.75 part of N-cyclohexyl-2-benzothiazolesulfenamide accelerator. For testing as antioxidants, there was incorporated in stocks A, B, C and D 2 parts of 3-n-butylamino-6-chloropyridazine, 3-di-n-butylamino-6-chloropyridazine, 3-cyclohexylamino-6-chloropyridazine, and 3-anilino-6-chloropyridazine, respectively. For comparison purposes, there was incorporated in stock E a conventional commercial antioxidant combination, viz. 2.0 parts of BLE (a high temperature reaction product of diphenylamine and acetone having a specific gravity of 1.09) and 0.35 part of JZF (N,N'-diphenyl-p-phenylenediamine).

Specimens of stocks A to E were cured in a press for 30 and 90 minutes at 293° F. and tested by the conventional testing methods used for rubber with results as shown in the following table:

| Physical Properties | Time of cure, minutes | A | B | C | D | E |
| --- | --- | --- | --- | --- | --- | --- |
| Unaged: | | | | | | |
| Tensile Strength (p.s.i.) | 30 | 3,660 | 3,910 | 3,820 | 3,600 | 4,090 |
| | 90 | 3,750 | 3,560 | 3,640 | 3,650 | 3,640 |
| Elongation at Break (Percent) | 30 | 520 | 540 | 520 | 510 | 590 |
| | 90 | 530 | 530 | 540 | 550 | 590 |
| Modulus at 300% (p.s.i.) | 30 | 1,850 | 1,675 | 1,750 | 1,725 | 1,500 |
| | 90 | 1,600 | 1,425 | 1,550 | 1,425 | 1,225 |
| Aged, 72 hrs. in air at 212° F.: | | | | | | |
| Tensile Strength (p.s.i.) | 30 | 1,610 | 1,520 | 1,880 | 1,600 | 1,600 |
| | 90 | 1,270 | 1,240 | 1,390 | 1,140 | 1,500 |
| Elongation at Break (Percent) | 30 | 260 | 270 | 300 | 300 | 260 |
| | 90 | 250 | 280 | 290 | 270 | 280 |
| Modulus at 300% (p.s.i.) [1] | 30 | 2,000 | 1,925 | 2,000 | 1,875 | 2,200 |
| | 90 | 1,750 | 1,500 | 1,625 | 1,675 | 1,850 |

[1] Extrapolated values.

The above data demonstrate that the chemicals of the present invention are equally as effective with respect to aging characteristics after 72 hours' exposure in air at 212° F. as the conventional commercial antioxidant combination.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A sulfur-vulcanizable diene rubber composition comprising 0.1 to 5 parts by weight per 100 parts of rubber of a compound represented by the formula

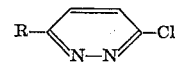

wherein R is selected from the group consisting of monoalkylamino, dialkylamino, cycloalkylamino and anilino.

2. A sulfur-vulcanizable diene rubber composition comprising 0.1 to 5 parts by weight of 3-n-butylamino-6-chloropyridazine per 100 parts of rubber.

3. A sulfur-vulcanizable diene rubber composition comprising 0.1 to 5 parts by weight of 3-di-n-butylamino-6-chloropyridazine per 100 parts of rubber.

4. A sulfur-vulcanizable diene rubber composition comprising 0.1 to 5 parts by weight of 3-cyclohexylamino-6-chloropyridazine per 100 parts of rubber.

5. A sulfur-vulcanizable diene rubber composition comprising 0.1 to 5 parts by weight of 3-anilino-6-chloropyridazine per 100 parts of rubber.

6. A composition comprising a vulcanized sulfur-vulcanizable diene rubber stock containing 0.1 to 5 parts by weight per 100 parts of rubber of a compound represented by the formula

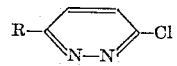

wherein R is selected from the group consisting of monoalkylamino, dialkylamino, cycloalkylamino and anilino.

7. A composition comprising a vulcanized sulfur-vulcanizable diene rubber stock containing 0.1 to 5 parts by weight of 3-n-butylamino-6-chloropyridazine per 100 parts of rubber.

8. A composition comprising a vulcanized sulfur-vulcanizable diene rubber stock containing 0.1 to 5 parts by weight of 3-di-n-butylamino-6-chloropyridazine per 100 parts of rubber.

9. A composition comprising a vulcanized sulfur-vulcanizable diene rubber stock containing 0.1 to 5 parts by weight of 3-cyclohexylamino-6-chloropyridazine per 100 parts of rubber.

10. A composition comprising a vulcanized sulfur-vulcanizable diene rubber stock containing 0.1 to 5 parts by weight of 3-anilino-6-chloropyridazine per 100 parts of rubber.

References Cited by the Examiner

FOREIGN PATENTS 822,069    10/1959    Great Britain.

LEON J. BERCOVITZ, *Primary Examiner.*
M. J. WELSH, *Assistant Examiner.*